Patented Nov. 4, 1941

2,261,611

UNITED STATES PATENT OFFICE 2,261,611

STABILIZED VINYL RESIN

Donald M. Young and William M. Quattlebaum, Jr., Charleston, W. Va., assignors to Carbide and Carbon Chemicals Corporation, a corporation of New York No Drawing. Application February 23, 1939, Serial No. 257,973

8 Claims. (Cl. 260—23)

The present invention is directed to stabilized vinyl resins having enhanced resistance to the damaging effects of heat. The vinyl resins to which this invention is applicable are those which may be formed by the conjoint polymerization of vinyl halides with unsaturated polymerizable substances. As examples of such polymerizable substances may be mentioned the following classes of compounds: vinyl esters of carboxylic acids; acrylic and methacrylic acids and esters; esters of itaconic and citraconic acids; α, β-unsaturated aldehydes and ketones, such as crotonaldehyde, acrolein, and methyl vinyl ketone; and unsaturated hydrocarbons, such as styrene, butadiene, and isoprene. The invention is especially applicable to those vinyl resins which may be formed by the conjoint polymerization of vinyl chloride with the vinyl esters of the lower aliphatic acids and, in particular, those containing from about 60% to about 95% vinyl chloride in the polymer.

Vinyl resins of the type referred to above possess great utility for many applications, such as for use in molding compositions, in lacquers and in a variety of coating compositions. They possess, however, insufficient resistance to the damaging effects of heat to be entirely satisfactory for many of these applications. These damaging effects may be characterized by the development of color in the resins and, if the heating is prolonged, by actual decomposition and charring of the resins with the evolution of gaseous, acidic decomposition products.

In Patent No. 2,075,543 issued to Marion C. Reed and Frazier Groff, it is suggested to incorporate basic metallic soaps and metallic salts of weak organic acids with the vinyl resin as a means of improving their resistance towards the damaging effects of heat. The compounds suggested are reasonably successful in accomplishing this purpose but suffer from the fact that the compounds are not completely compatible or miscible with the vinyl resins. As a result of this lack of complete miscibility, or compatibility, these compounds, and in particular the salts of the weak organic acids, are very apt to cause, of themselves, undesirable haze in the resins. This undesirable haze may be accentuated when the resins are subjected to heat.

According to this invention, improved stabilizing agents have been developed which impart greater heat stability to the resins than the previously known compounds, without any detriment to the clarity or color of the resins.

These stabilizing agents are prepared by fusing alkali metal salts of the lower fatty acids with any of the corresponding salts of lead or cadmium. For the purpose of this invention, the lower fatty acids are defined as those containing from one to six carbon atoms, and thus they include formic, acetic, propionic, butyric, valeric and hexoic acids. As a result of the fusion, a glass-like product is obtained which can be dispersed readily in the vinyl resins to form a stabilized composition having unusual clarity and heat stability. This stabilized composition exhibits greater heat stability and clarity than similar compositions do which contain an equal amount of either of the components singly. This stabilized composition also exhibits much greater clarity than similar compositions containing the same amount of unfused mixtures of the ingredients in the same proportions.

It readily will be recognized, therefore, that by fusing the heat-stabilizing agents of this invention with each other, prior to incorporating these agents with the vinyl resins, certain definite advantages are gained. In this manner, the heat-stabilizing agents are made completely compatible with the resins, whereas the original ingredients are not completely compatible with the resins. The ingredients to be fused are most desirably in the form of hydrated salts and the fusion is preferably carried out under heating until most of the water has been driven off. It is not essential, however, that the water be completely removed, since the product may be used in the initial stages of the fusion when it exists as a very viscous fluid.

Another characteristic of our invention is that the effectiveness of other stabilizing agents, such as lead stearate or lead oleate, is enhanced by additionally incorporating small amounts of the fused heat-stabilizing agents of this invention with the resin to be stabilized. It is significant, also, that the presence of the fused, glass-like stabilizers inhibits the development of haze on heating, which normally occurs in the resins in the presence of the usual stabilizing compounds composed of lead compounds.

The effectiveness, as well as the manner of preparation of the new stabilizing compounds, can be clearly demonstrated by several examples.

Example 1

A mixture of 75 parts of cadmium acetate dihydrate and 25 parts of sodium acetate trihydrate was slowly heated with stirring to about 50° to 80° C., and the mixture was fused to a clear viscous fluid. The heating was continued until the temperature reached 180° C., or until most of the water had been removed. Upon cooling, the fused mixture set to a clear, colorless, and easily crushable glass-like product.

One part of this glass-like product, in powdered form, was incorporated with 99 parts of a resin, resulting from the conjoint polymerization of vinyl chloride with vinyl acetate and containing about 87% vinyl chloride in the polymer, by grinding the mixture on a roll mill. A plaque pressed from the milled sheet possessed excellent clarity and, when heated at 135° C. for 2.5 hours, it remained virtually unchanged in color and free from haze. In contrast, plaques pressed from the same resin containing 1% lead stearate incorporated in the same manner were initially hazy and they developed much more haze and color when heated for only one hour at the same temperature. At the end of two hours heating, the resin stabilized with lead stearate was black, having undergone decomposition.

Further comparative tests indicate that fusion of the cadmium acetate with the sodium acetate produces a stabilizing material having inherently new properties not found in the original materials. For instance, the resin described above was incorporated with 1% cadmium acetate alone and the resin, when heated at 135° C., turned dark in color in only 0.5 hour. When the experiment was repeated, using 1% sodium acetate alone, unsatisfactory results were also obtained, the resin turning orange-yellow in color after only 0.5 hour.

The vinyl resin used in the succeeding examples was identical with that used in Example 1.

Example 2

A mixture of 75 parts of cadmium acetate dihydrate and 25 parts of sodium acetate trihydrate was heated with stirring to 85° C., care being taken to avoid the loss of water. A clear viscous product was obtained on cooling.

On milling 1.25% of this stabilizer into the vinyl resin, which is equivalent to the 1% of the anhydrous product used in Example 1, a stabilized composition of equally good clarity, freedom from haze, and heat stability was obtained.

Example 3

A mixture of 83.3 parts of cadmium acetate dihydrate and 16.7 parts of anhydrous sodium acetate was heated to 95° C. with stirring, care being taken to avoid any loss of water. The product, on cooling, was a clear, sticky, viscous mass.

When the vinyl resin was incorporated with 1.13% of this mixture, this amount being equivalent in anhydrous salt content to the stabilizer described in Example 1, a stabilized composition of equally good clarity, freedom from haze, and heat stability was obtained.

Example 4

One and one-half parts of lead stearate and 0.5 part of the glass-like product prepared as described in Example 1, were milled into 98 parts of the vinyl resin. A similar composition was prepared containing 2 parts of lead stearate and 98 parts of the vinyl resin. Comparison of the two compositions showed that, on subjecting them to temperatures of 150° C., the haze-free period of the former, which contained a small percentage of the cadmium acetate-sodium acetate glass, was about twice that of the latter, and that the ultimate heat stability of the former was markedly better than the latter.

Example 5

A cadmium acetate and potassium acetate fused product was prepared by heating a mixture consisting of 83.3 parts of cadmium acetate dihydrate, 16.7 parts of anhydrous potassium acetate, and a little water to 95° C. with stirring, care being taken to avoid loss of water. On cooling, a clear, sticky, viscous product was obtained which served as a satisfactory stabilizer when incorporated with the vinyl resin in the manner indicated in the previous examples.

Example 6

A lead acetate and sodium acetate fused product was prepared by heating a mixture of 80 parts of lead acetate trihydrate and 20 parts of sodium acetate trihydrate with stirring to 70° C. to 80° C., wherein the mixture fused to a clear, viscous mass. The heating was continued until the temperature reached 160° C., or until most of the water had been removed. On cooling, the mixture set to a clear, colorless glass-like product which was easily crushed and ground.

Two parts of this glass were milled into 98 parts of the vinyl resin and a composition obtained which possessed far greater clarity than similar compositions showed which contained a like amount of the unfused mixture, or a like amount of either component. Additionally, the ultimate heat stability at 150° C. of the resin containing the glass was more than twice as great as that obtained with like amounts of commonly used stabilizers, such as lead stearate, and it was markedly better than that obtained with a like amount of either component alone of the fused product.

Example 7

The method for preparing the glass-like product described in the preceding example was repeated using 75 parts of lead acetate trihydrate and 25 parts of sodium acetate trihydrate. When 1% of the product thus obtained was incorporated in the vinyl resin by milling, a stabilized composition was obtained which remained light in color after 3 hours heating at 135° C. In contrast, the vinyl resin containing 1% of lead acetate alone, or 1% of sodium acetate alone, when heated at 135° C., discolored after 1.5 hours and 0.5 hour, respectively.

It is to be understood that the invention is by no means limited to the particular examples shown. The proportions of the alkali metal salts of the lower fatty acids and the lead or cadmium salts of these acids to be fused may be varied in any degree and improved heat stability obtained when the products thus formed are incorporated with vinyl halide resins. However, to obtain the best clarity in the resins, it is preferable to use not more than one part of one or more of the former group of salts to one part of one or more of the latter group. Within these ranges, it is preferable to use about three parts of lead or cadmium acetate to one part of the alkali metal acetate.

The amount of the fused glass-like product which may be incorporated with the resins may be varied widely. However, it is preferred to use it in amounts from about 0.2% to about 10% by weight of the resin. It is thus seen that many modifications in preparing and using the fused glass-like products as stabilizers for vinyl halide resins will be apparent to those skilled in the art, and such modifications are included within the scope of the invention as defined by the appended claims.

We claim:

1. A composition of unusual clarity and resistance to the damaging effects of heat, comprising a vinyl resin, including a vinyl halide polymerized therein, intimately combined with a stabilizing amount of a product resulting from heating one of the group consisting of the lead and cadmium salts of the lower fatty acids with an alkali metal salt of these acids.

2. A composition of unusual clarity and resistance to the damaging effects of heat, comprising a vinyl resin, including a vinyl halide polymerized therein, intimately combined with a stabilizing amount of a product resulting from heating lead acetate with an alkali metal acetate.

3. A composition of unusual clarity and resistance to the damaging effects of heat, comprising a vinyl resin substantially identical with that resulting from the conjoint polymerization of vinyl chloride with a vinyl ester of a lower aliphatic acid, intimately combined with a stabilizing amount of a glass-like product resulting from heating in the presence of water one of the group consisting of the lead and cadmium salts of the lower fatty acids with an alkali metal salt of these acids.

4. A composition of unusual clarity and resistance to the damaging effects of heat, comprising a vinyl resin substantially identical with that resulting from the conjoint polymerization of vinyl chloride with a vinyl ester of a lower aliphatic acid, intimately combined with a stabilizing amount of a glass-like product resulting from heating cadmium acetate with an alkali metal acetate.

5. A composition of improved clarity and resistance to the damaging effects of heat, comprising a vinyl resin substantially identical with that resulting from the conjoint polymerization of vinyl chloride with vinyl acetate, intimately combined with a stabilizing amount of a lead salt of a higher fatty acid together with a stabilizing amount of a viscous to solid product resulting from heating one of the group consisting of lead and cadmium salts of the lower fatty acids with an alkali metal salt of these acids.

6. Process for making a composition of matter adapted to impart clarity and resistance to damage by heat to vinyl resins, which include a vinyl halide polymerized therein, which comprises heating in the presence of water one of the group consisting of the lead and cadmium salts of the lower fatty acids with an alkali metal salt of these acids, and forming a viscous to solid, glass-like product.

7. Process for making a composition of matter adapted to impart clarity and resistance to damage by heat to vinyl resins, which include vinyl chloride polymerized therein, which comprises heating lead acetate with an alkali metal acetate in the presence of water.

8. Process for making a composition of matter adapted to impart clarity and resistance to damage by heat to vinyl resins, which include vinyl chloride polymerized therein, which comprises heating cadmium acetate with an alkali metal acetate in the presence of water.

DONALD M. YOUNG.
WILLIAM M. QUATTLEBAUM, Jr.